United States Patent [19]
Atkinson et al.

[11] Patent Number: 6,151,112
[45] Date of Patent: Nov. 21, 2000

[54] HIGH-RESOLUTION, COMPACT INTRACAVITY LASER SPECTROMETER

[75] Inventors: George H. Atkinson; Yu Yan, both of Tucson, Ariz.

[73] Assignee: Innovative Lasers Corp., Tucson, Ariz.

[21] Appl. No.: 08/971,525

[22] Filed: Nov. 17, 1997

[51] Int. Cl.[7] ........................................ G01J 3/18
[52] U.S. Cl. ............................ 356/328; 356/334
[58] Field of Search .......................... 356/328, 332, 356/333, 334

[56] References Cited

U.S. PATENT DOCUMENTS

| | | | |
|---|---|---|---|
| 4,636,074 | 1/1987 | Levy et al. | 356/328 |
| 4,684,253 | 8/1987 | Lindblom et al. | 356/333 |
| 4,697,924 | 10/1987 | Akiyama | 356/333 |
| 4,807,991 | 2/1989 | Carew | 356/328 |
| 5,565,983 | 10/1996 | Barnard | 356/328 |
| 5,579,106 | 11/1996 | Kremer | 356/328 |
| 5,689,334 | 11/1997 | Atkinson et al. | 356/326 |

FOREIGN PATENT DOCUMENTS

| | | | |
|---|---|---|---|
| 0 551 241 | 7/1993 | European Pat. Off. | 3/28 |
| WO93/16361 | 8/1993 | France | 356/334 |
| WO 97/09606 | 3/1997 | WIPO | 21/35 |

OTHER PUBLICATIONS

P. Lindblom et al, "Spectroscopy with the MEGA spectrometer, a very–high–resolution grating spectrometer", *Review of Scientific Instruments*, vol. 61, No. 10, Part I, Oct. 1990.

Eugene Hecht, "Optics", Adelphi University, Addison–Wesley Publishing Company, Second Edition, Ch. 5, pp. 163–166.

*Primary Examiner*—Frank G. Font
*Assistant Examiner*—Zandra V. Smith
*Attorney, Agent, or Firm*—Benman & Collins

[57] ABSTRACT

In accordance with the present invention, a high-resolution, compact spectrometer is provided for dispersing wavelengths $\lambda$ of an incoming beam for detection by a detector. The spectrometer comprises: (a) an entrance slit through which the incoming beam passes; (b) a first mirror for collimating the beam from the entrance slit; (c) a first reflectance grating for dispersing the collimated beam to form a beam having a spectral intensity distribution, the first reflectance grating having a number of grooves $N_1$; (d) a second reflectance grating for further dispersing the collimated beam, the second reflectance grating having a number of grooves $N_2$; and (e) a second mirror for focusing the collimated and dispersed beam, wherein the spectrometer has a substantially symmetrical construction. The symmetrical construction of the spectrometer doubles the resolution and dispersion of the gratings. The compact and high-resolution imaging spectrometer is capable of measuring the absorption lines of gases in high sensitivity gas sensors with an intracavity cell.

8 Claims, 3 Drawing Sheets

HIGH-RESOLUTION, COMPACT INTRACAVITY LASER SPECTROMETER

TECHNICAL FIELD

This invention relates, generally, to imaging spectrometers, and, more particularly, to imaging spectrometers based on intracavity laser spectroscopy.

BACKGROUND OF THE INVENTION

A laser in its simplest form can be schematically illustrated as including a gain medium that is located between two mirrors. Light within the laser cavity is reflected back and forth between the mirrors, each time passing through the gain medium, which produces optical gain. The mirror coating on the first mirror may be totally reflective, while the mirror coating on the second mirror may be partially reflective, thereby permitting some light to escape from the laser cavity. The spatial region between the reflective surfaces of the mirrors defines the laser resonator or cavity, and in the context of the present invention relates to the so-called "intracavity region".

The intensity of the laser output is a function of both the wavelength region over which the gain medium operates and the reflectivity of the resonator elements. Normally this output is broad and without sharp, distinctive spectral features.

The identification of gaseous species, e.g., atoms, molecules, radicals, or ions, via laser spectroscopy requires that the laser output be in a wavelength region where the species absorbs. In conventional applications of lasers to the detection of gaseous species, laser radiation is used to excite a gas sample that is external to the laser in order to produce a secondary signal such as ionization or fluorescence. Alternatively, in conventional absorption spectroscopy, laser light is passed through a gas sample that is situated outside of the laser and attenuation that varies with wavelength is monitored.

Some twenty years ago, another detection methodology, intracavity laser spectroscopy (ILS) was first explored; see, e.g., G. Atkinson, A. Laufer, M. Kurylo, "Detection of Free Radicals by an Intracavity Dye Laser Technique," 59 *Journal Of Chemical Physics*, Jul. 1, 1973. In ILS, a laser itself is used as the detector. The gas sample to be analyzed is inserted into the optical cavity of a multimode, homogeneously broadened laser. Atkinson et al, supra, showed that by placing gaseous molecules, atoms, radicals, and/or ions in either their ground or excited states inside the optical cavity, the laser output can be altered. In particular, the absorption spectrum of the intracavity species appears in the spectral output of the laser.

Distinct absorption features in the laser output arise from the intracavity losses introduced by the gaseous species that are absorbing. (As used herein, an absorption feature corresponds to a series of consecutive wavelengths where the light intensity reaches a local minimum in a plot of light intensity versus wavelength.) In a multi-mode laser, intracavity absorption losses compete with the laser gain via the normal mode dynamics. As a result, attenuation can be observed in the laser output intensity at wavelengths where the stronger intracavity absorption features compete effectively against the gain of the laser. The more intense the absorption features, the larger the decrease in the laser output intensity at those wavelengths.

By inserting the absorbing gaseous species inside the laser resonator, ILS can provide a detection sensitivity that is enhanced over conventional spectroscopy methods. The enhanced detection sensitivity of ILS techniques derives from the non-linear competition between (1) the gain produced in the laser gain medium and (2) the absorber loss(es). As a result, ILS can be utilized to detect both weak absorption and/or extremely small absorber concentrations.

Each gaseous species in the optical cavity can be uniquely identified by its respective absorption spectrum or signature. Additionally, the intensity of a specific absorption feature or features in the spectral signature can be used to determine the concentration of the gaseous species once the sensor is appropriately calibrated. (As used herein, the term "spectral signature" corresponds to the wavelength plotted against absorption intensity or absorbance that uniquely identifies the gaseous species.)

The spectral signature of the gaseous species can be obtained by dispersing the output of the ILS laser with respect to wavelength. Two detection schemes are typically employed to disperse the output of the ILS laser and thereby obtain the spectral signature of the gaseous species. The output of the ILS laser can be passed through a fixed-wavelength, dispersive spectrometer, and the specific spectral region that is resolved by this spectrometer can be recorded using a multichannel detector; see patent application Ser. No. 08/675,605 filed on Jul. 3, 1996, by G. H. Atkinson et al entitled "Diode Laser-Pumped Laser System for Ultra-Sensitive Gas Detection via Intracavity Laser Spectroscopy (ILS)". Alternatively, a spectrometer that can be scanned in wavelength can be employed to selectively resolve different spectral regions that are recorded with a single channel detector, supra.

Prior art ILS detection systems employ ILS lasers having a spectral bandwidth that is substantially broad relative to the bandwidth of the absorption features in the absorption spectrum of the intracavity species to be detected; see U.S. Pat. No. 5,689,334, issued Nov. 18, 1997, by G. H. Atkinson et al entitled "Intracavity Laser Spectroscope for High Sensitivity Detection of Contaminants". In particular, the laser systems possess an operational wavelength bandwidth that is at least three times as broad as the absorption features of the gaseous species being monitored.

Prior art methods of performing ILS, however, while successfully demonstrated in the laboratory, are too large and complex for many commercial applications. In particular, the requirement for a spectrometer to disperse the spectral output of the laser, as well as for a computer to analyze the absorption features, adds to the size and complexity of the detection system. In contrast, the constraints of commercial reality dictate that a gas detector be conveniently sized, relatively inexpensive, and reliable.

Thus, what is needed is a high-resolution, compact spectrometer for ILS applications.

SUMMARY OF THE INVENTION

In accordance with the present invention, a high-resolution, compact intracavity laser spectrometer is provided. By "high-resolution" is meant that the resolution of the spectrometer is less than about 1 part in 50,000. The spectrometer, which disperses wavelengths $\lambda$ of an incoming beam for detection by a detector, comprises:

(a) a focusing lens which matches the numerical aperture of the spectrometer;

(b) an entrance slit through which the incoming beam passes;

(c) a first mirror for collimating the beam from the entrance slit;

(d) a first reflectance grating for dispersing the collimated beam to form a beam having a spectral intensity distribution, the first reflectance grating having a number of grooves $N_1$;

(e) a second reflectance grating for further dispersing the collimated beam, the second reflectance grating having a number of grooves $N_2$; and (f) a second mirror for focusing the collimated and dispersed beam, wherein the spectrometer has a substantially symmetrical construction.

The spectrometer of the invention is especially useful in conjunction with a linear photodiode array.

The symmetrical construction of the spectrometer doubles the resolution and dispersion of the gratings. The compact and high-resolution imaging spectrometer is capable of measuring the absorption lines of gases in high sensitivity gas sensors with an intracavity cell.

Other objects, features, and advantages of the present invention will become apparent upon consideration of the following detailed description and accompanying drawings, in which like reference designations represent like features throughout the Figures.

BRIEF DESCRIPTION OF THE DRAWINGS

The drawings referred to in this description should be understood as not being drawn to scale except if specifically noted.

DESCRIPTION OF PREFERRED EMBODIMENTS

Reference is now made in detail to a specific embodiment of the present invention, which illustrates the best mode presently contemplated by the inventors for practicing the invention. Alternative embodiments are also briefly described as applicable.

Figure 1:
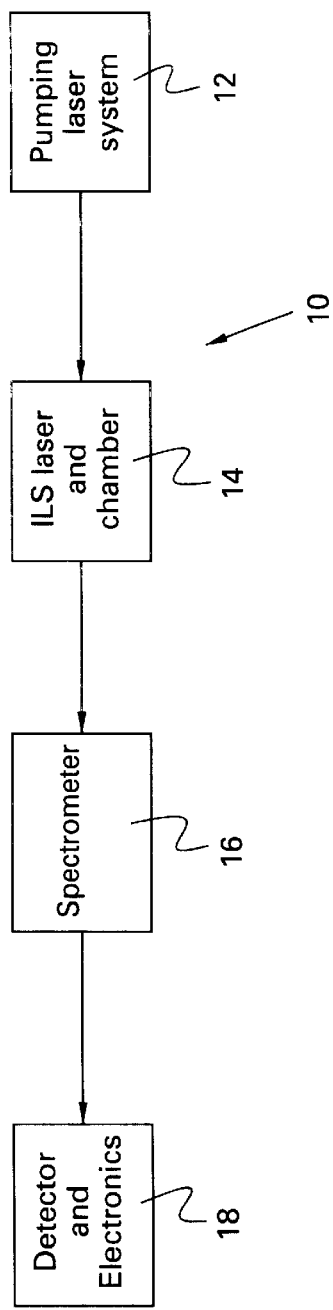
FIG. 1 is schematic block diagram of a detector system which employs the spectrometer of the present invention.

With reference now to FIG. 1, a gas detector system 10 is shown, which comprises a pumping laser 12, an intracavity laser spectroscopy (ILS) laser and associated chamber 14, a spectrometer 16, and a detector with associated electronics (e.g., computer, digital electronics, etc.) 18. The gas detector system 10 has been described in detail elsewhere; see, e.g., U.S. Pat. No. 5,689,334, issued Nov. 18, 1997.

Figure 2:
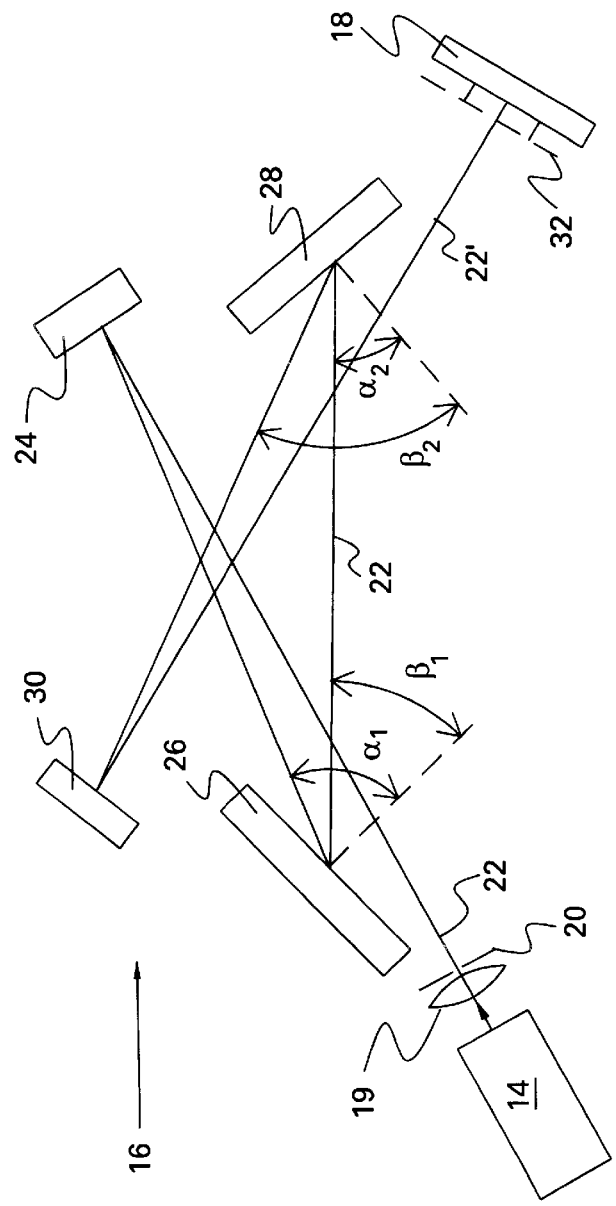
FIG. 2 is a schematic diagram of the spectrometer of the invention, employing two reflectance gratings.

In accordance with the present invention, the spectrometer 16 is an imaging spectrometer and employs two reflective concave mirrors, two plane reflectance gratings, and an entrance slit. Advantageously, a linear photodiode array is employed as the detector 18. FIG. 2 depicts the imaging spectrometer 16 of the present invention. The spectrometer 16 comprises the entrance slit 20, through which a spatially coherent beam 22 is introduced into the spectrometer. The spatially coherent beam 22 is from ILS laser 14, and passes through a lens 19 prior to passing through the entrance slit 20. The spectrometer 16 gives a diffraction-limited image with a spot size proportional to its f-number, which is defined as the ratio between focal length and the stop aperture of the spectrometer. To image the incoming laser light 22 to the entrance slit 20 of the spectrometer 16, the lens 19 is one having its f-number substantially equal to the f-number of the spectrometer.

The beam 22 impinges on a collimating mirror 24, which may be concave, where it is collimated and is then directed to a first reflectance grating 26, where the wavelengths are dispersed. For clarity, the collimation of the beam 22 is not shown. From the first reflectance grating 26, the beam 22 is directed to a second reflectance grating 28, where the wavelengths are further dispersed, and then to a focusing mirror 30, which may also be concave. The second grating 28 is set so that the diffraction angle of the wavelength of interest at the second grating is substantially equal to the incident angle of the wavelength at the first grating 26. The focusing mirror 30 focuses the beam 22 onto a plane 32, which may be an exit slit (not shown) or the detector 18, where the beam is analyzed. A photodetector array is suitably employed as the detector 18. The imaging spectrometer 16 has a symmetric construction, as described more fully below.

The resolution of the two gratings 26, 28 is given by $$\partial \lambda = \frac{\lambda}{m(N_1 + N_2)}$$

where $\lambda$ is the wavelength of interest, m is the diffraction order, and $N_1$ and $N_2$ are the number of grooves of the first and second gratings 26, 28, respectively.

In the symmetrical case, $N_1 = N_2$, so the above equation reduces to $$\partial \lambda = \frac{\lambda}{2mN}.$$

The resolution of the imaging spectrometer 16 generally depends not only on the grating 26, 28, but on the dimensions and locations of the entrance slit 20, the detector pixel aperture, and the aberrations in the imaging optics 24, 30. The two gratings 26, 28 provide an increase in resolution over a single grating; the highest resolution is obtained by establishing symmetry in the spectrometer 16.

The dispersion of the two gratings 26, 28 is given $$\frac{\partial \beta_2}{\partial \lambda} = \frac{\cos\alpha_2 + \cos\beta_1}{\cos\beta_1 \cdot \cos\beta_2} mg$$

where $\alpha_i$ is the incident angle and $\beta_i$ is the diffraction angle of the gratings, g is the groove frequency of the grating (number of grooves N per mm) and m is the diffraction order.

In the symmetric case, $\alpha_2 = \beta_1$, $\beta_2 = \alpha_1$, and the above equation reduces to $$\frac{\partial \beta_2}{\partial \lambda} = \frac{2mg}{\cos\beta_2}.$$

Figure 3:
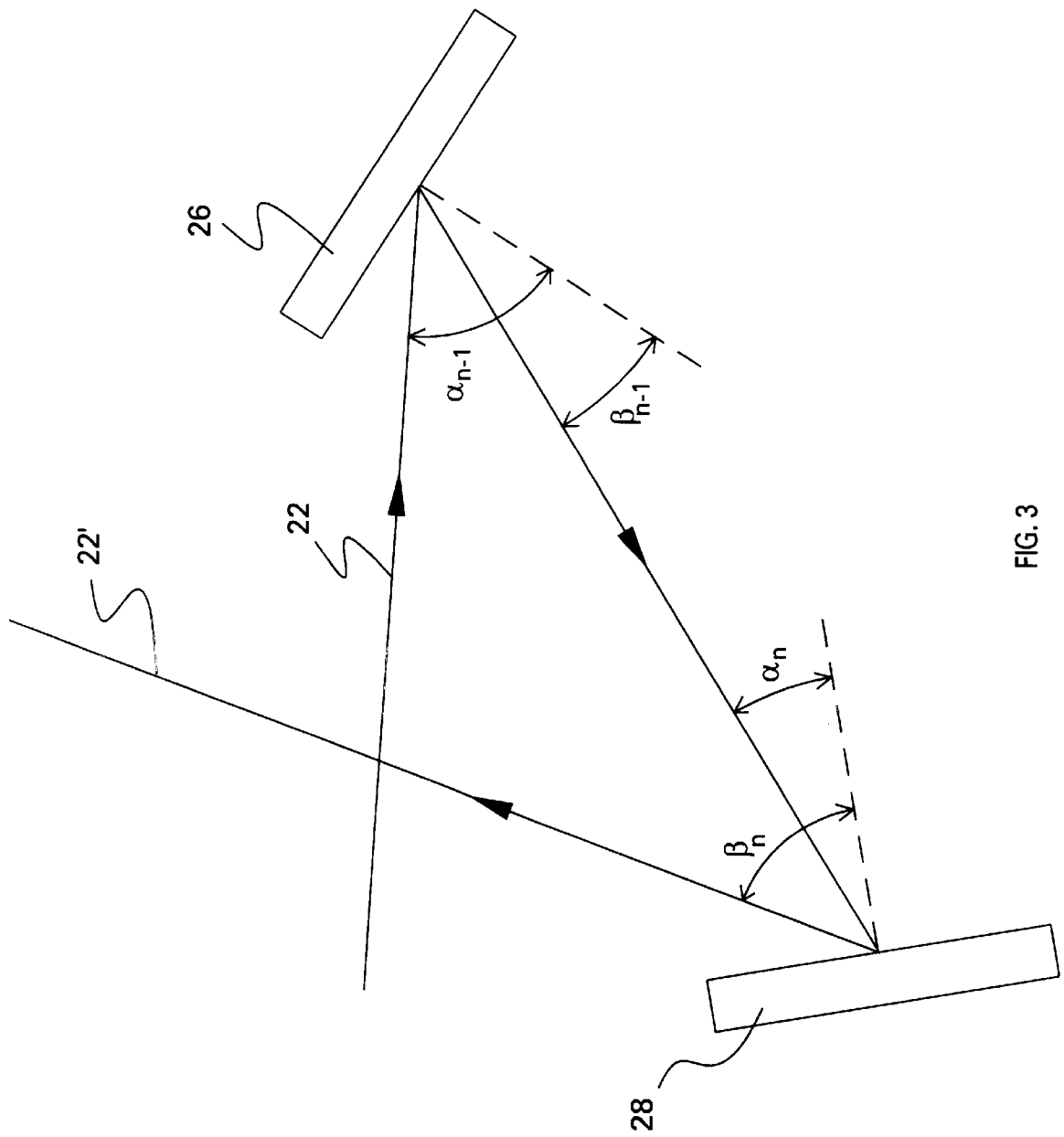
FIG. 3 is a schematic diagram of the spectrometer of the invention, showing the angular requirements of the reflectance gratings to produce symmetry in the spectrometer.

The incident and diffraction angles are depicted in FIG. 3, discussed below. The compact imaging spectrometer 16 of the present invention results from the doubled dispersion of two gratings 26, 28.

FIG. 3 is a schematic representation of the spectrometer 16, showing the two gratings 26, 28 in angular, spaced relationship to each other, with entering beam 22 impinging on the first grating 26 and exiting beam 22' emerging from the second grating 28. Symmetry of the spectrometer 16 for any number of gratings is derived from the following considerations:

$$\alpha_{n-1} = \beta_n$$
$$\beta_{n-1} = \alpha_n.$$

For an even total number of gratings:

$$\beta_{even} > \alpha_{even}$$
$$\beta_{odd} < \alpha_{odd}.$$

For an odd total number of gratings:

$$\beta_{even} < \alpha_{even}$$
$$\beta_{odd} > \alpha_{odd}.$$

The source of the beam 22 entering the spectrometer 16 is the ILS laser 14, which provides a spatially coherent beam (high intensity, narrow beam). The use of a spatially coherent beam is in direct contrast to the spatially incoherent beams analyzed by most spectrometers.

Figure 4:
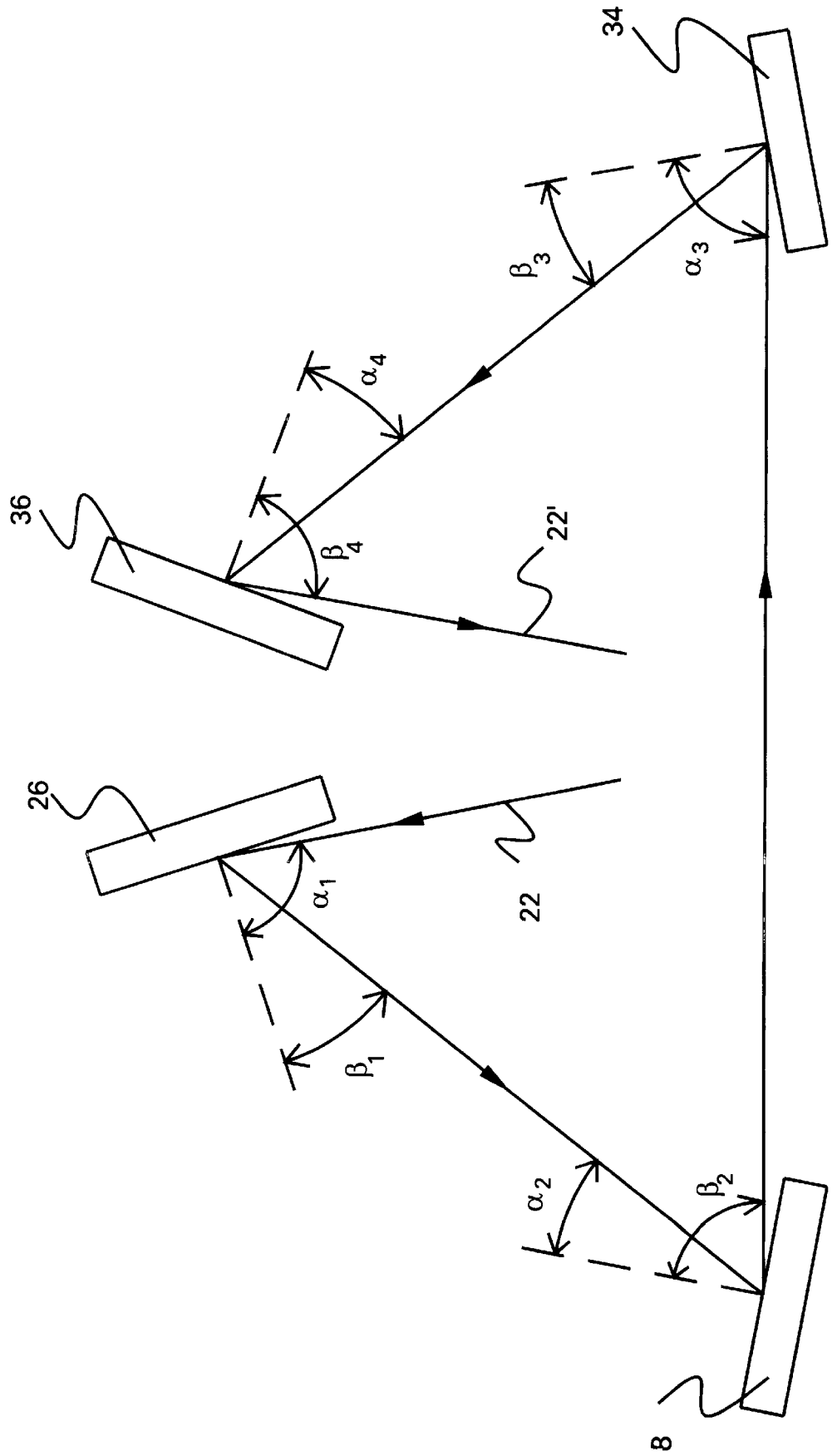
FIG. 4 is a schematic diagram of the spectrometer of the invention, showing the angular requirements when employing more than two reflectance gratings.

While two gratings 26, 28 are shown in FIG. 1, more than two gratings can be used. The utilization of a plurality of gratings increases the wavelength dispersion of the beam 22 that exits the spectrometer 16 to the exit plane 32 (exit slit or photodetector 18, for example). FIG. 4 depicts spectrometer 16 having four diffraction gratings 26, 28, 34, 36.

Because of the symmetrical construction of the spectrometer 16, discussed below, the number of the gratings can be extended to 4, 6, 8, . . . and the resolution and dispersion are increased $2^{4/2}, 2^{6/2}, 2^{8/2}, \ldots$ times.

Further, both spectrometer gratings 26, 28 are fixed, and thus are not scanned. Since the gratings 26, 28 are not scanned, no motors are required, thereby further simplifying and reducing the size of the spectrometer 16.

The beam 22 incident on the grating 26 is employed at grazing incidence and therefore fills the entire grating. Using the entire grating increases wavelength resolution. The resolution increases with the number of grooves N on the grating, but if the beam is not incident on a portion of the grating, those grooves are not employed in diffracting the beam. Thus, filling the grating is critical to taking advantage of the potential dispersion that the grating may provide.

The resolution is determined by the convolution of the width of the entrance slit 20, the dispersion of the gratings 26, 28, and the width of the exit slit or of the pixels in the linear detector array 18.

In the spectrometer 16 of the present invention, the gratings 26, 28 act as a telescope or beam expander with a total magnification of unity. The second mirror 30 focuses the dispersed beam 22 diffracted from the second grating 28. In this connection, the beam exiting the spectrometer 16 is brought to a linear plane 32 as a consequence of the configuration of the spectrometer. The linear photodiode array 18 is used to detect the spectral intensity distribution of the beam 22 at the same time. The linear photodiode array 18 can be any single channel detector for a monochromatic spectrometer.

Because of the symmetrical construction of the spectrometer 16, the two gratings operate as a telescope with the magnification of 1×. The numerical aperture (or f-number) of the collimating mirror 24 is the same as that of the focusing mirror 30, no matter how many gratings are used.

As used herein, the term "substantially symmetrical" means that the symmetry achieved is as good as can be accomplished with present engineering capabilities, it being recognized that perfect symmetry may not be completely attainable at the present time. Employing the substantially symmetrical elements as disclosed herein, however, will provide the highest degree of resolution and compactness possible.

The compact and high resolution imaging spectrometer 16 of the present invention is capable of measuring the absorption lines for high sensitivity gas sensors with an intracavity cell.

The most important advantage is the symmetrical construction of the imaging spectrometer 16, which doubles the resolution and dispersion of the gratings 26, 28.

As is evident from the drawings, the mirrors 24, 30 fold the beam 22 between the gratings 26, 28 and mirrors. The folding of the beam 22 results in the compact size for the high resolution imaging spectrometer 16 of the invention.

The symmetrical grating construction of the spectrometer 16 with high resolution is useful in ILS systems for measuring the absorption lines of gases, using high sensitivity gas sensors with the intracavity cell. Further, the symmetrical grating construction is able to provide high dispersion for a coherent laser, while providing some tunibility within a narrow range.

Thus, a high-resolution, compact intracavity laser spectrometer is disclosed. It will be readily apparent to those skilled in this art that various modifications may be made in the design and arrangement of the elements set forth herein, and all such changes and modifications are considered to fall within the scope of the invention as defined by the appended claims.

What is claimed is:

1. A spectrometer for dispersing wavelengths λ of an incoming beam for detection by a detector, said spectrometer comprising:

(a) an entrance slit through which said incoming beam passes;

(b) a first mirror for collimating said beam from said entrance slit;

(c) a first reflectance grating for dispersing said collimated beam to form a beam having a spectral intensity distribution, said first reflectance grating having a number of grooves $N_1$;

(d) a second reflectance grating for further dispersing said collimated beam, said second reflectance grating having a number of grooves $N_2$;

(e) a second mirror for focusing said collimated and dispersed beam, wherein said spectrometer has a substantially symmetrical construction, wherein said symmetrical construction is derived from $$\alpha_{n-1} = \beta_n$$
$$\beta_{n-1} = \alpha_n,$$

where α is an incident angle and β is a diffraction angle of a said grating, both said gratings fixed in position, and $N_1 = N_2$; and (f) an exit plane on which said beam is focused, wherein said exit plane comprises a linear photodiode detector array so as to permit detection of said spectral intensity distribution of said beam at the same time, said linear photodiode detector array comprising a single channel detector.

2. The spectrometer of claim 1 having a numerical aperture and further comprising a focusing lens matching said numerical aperture.

3. The spectrometer of claim 1 further comprising an even number of additional reflectance gratings between said second reflectance grating and said second mirror.

4. The spectrometer of claim 1 wherein for an even number of gratings $$\beta_{even} > \alpha_{even}$$

$$\beta_{odd} < \alpha_{odd}.$$

5. The spectrometer of claim 1 for use in an intracavity spectrometer for measuring absorption lines of gases.

6. The spectrometer of claim 1 wherein said incoming beam is spatially coherent.

7. The spectrometer of claim 1 wherein said two gratings provide a resolution for a wavelength $\lambda$ of interest given by $$\partial\lambda = \frac{\lambda}{m(N_1 + N_2)}$$

where each said grating has a diffraction order and a number of grooves and where m is said diffraction order, and $N_1$ and $N_2$ are said number of grooves of said first grating and second grating, respectively, wherein said symmetrical construction provides $$\partial\lambda = \frac{\lambda}{2mN}$$

where $N_1=N_2$.

8. The spectrometer of claim 1 wherein said two gratings have a dispersion that is given by $$\frac{\partial \beta_2}{\partial \lambda} = \frac{\cos\alpha_2 + \cos\beta_1}{\cos\beta_1 \cdot \cos\beta_2} mg$$

where each said grating has (1) an incident angle of impinging light and a diffraction angle of diffracted light, (2) a groove frequency in number of grooves per unit of linear measure, and (3) a diffraction order, and where $\alpha$ is said incident angle, $\beta$ is said diffraction angle, g is said groove frequency, and m is said diffraction order, wherein said symmetrical construction provides $$\frac{\partial \beta_2}{\partial \lambda} = \frac{2mg}{\cos\beta_2}$$

where $\beta_2$ is said diffraction angle of said second reflectance grating.

* * * * *